United States Patent
Mancuso et al.

[11] Patent Number: 6,026,700
[45] Date of Patent: Feb. 22, 2000

[54] TOOTH FORM PARAMETERS FOR GROUND TEETH OF GEAR SPINDLE COUPLING AND METHOD OF MAKING THE SAME

[75] Inventors: Jon R. Mancuso, Catonsville; Andrew M. Sima, Ellicott City; Charles L. Griffin, Glen Burnie; Robert O. Backus, Sykesville, all of Md.

[73] Assignee: Kop-Flex, Inc., Baltimore, Md.

[21] Appl. No.: 09/096,480

[22] Filed: Jun. 12, 1998

Related U.S. Application Data

[60] Provisional application No. 60/050,193, Jun. 19, 1997.

[51] Int. Cl.$^7$ .......................................... F16D 3/18
[52] U.S. Cl. ........................... 74/462; 464/158; 148/586; 451/47; 29/893.35
[58] Field of Search .......................... 74/462; 403/359.6, 403/359.4; 464/158, 157, 162; 29/893, 893.3, 893.35–893.37; 148/586, 226; 451/47

[56] References Cited

U.S. PATENT DOCUMENTS

| | | | |
|---|---|---|---|
| 1,305,050 | 5/1919 | Beall | 148/226 |
| 2,744,449 | 5/1956 | Belden et al. | 464/158 X |
| 2,922,924 | 1/1960 | Wildhaber | 464/158 |
| 2,927,510 | 3/1960 | Wildhaber | 464/158 X |
| 3,224,223 | 12/1965 | Wildhaber | 464/158 |
| 3,232,075 | 2/1966 | Wildhaber | 464/158 |
| 3,292,390 | 12/1966 | Wildhaber | 464/158 |
| 3,398,444 | 8/1968 | Nemy | 148/226 X |
| 3,477,250 | 11/1969 | Gregorich et al. | 403/359.6 X |
| 3,857,152 | 12/1974 | Wolf | 29/895.35 |
| 3,899,270 | 8/1975 | Swedberg | 464/158 X |
| 4,132,090 | 1/1979 | McDermott | 464/156 |
| 4,761,867 | 8/1988 | Vollmer et al. | 29/893.3 |
| 4,969,371 | 11/1990 | Allen | 464/157 X |
| 5,181,375 | 1/1993 | Thurman et al. | 451/47 |
| 5,718,774 | 2/1998 | Tsukamoto et al. | 29/893.36 X |

*Primary Examiner*—Charles A Marmor
*Assistant Examiner*—Ankur Parekh
*Attorney, Agent, or Firm*—Polster, Lieder, Woodruff & Lucchesi

[57] ABSTRACT

A gearset for a gear spindle coupling or the like, and method for forming the same, comprising a sleeve gear and a hub gear which may be ground after surface hardening without the introduction of undesired structural weakening. The sleeve gear includes internal gear teeth and the hub gear includes external gear teeth in mesh with the sleeve gear teeth. Each internal sleeve gear tooth has an internal profile with the tooth height ranging from about 1.9 to about 2.2 divided by the diametral pitch of the sleeve gear, and each external hub gear tooth has a contact height less than the full tooth height. The contact height of the external tooth ranges from about 1.4 to about 1.6 divided by the diametral pitch of the hub gear, with the hub gear tooth region ranging between about 1.4/diametral pitch to about 1.6/diametral pitch. The whole depth of each external gear tooth ranges between about 1.5/diametral pitch to about 1.8/diametral pitch, and the whole depth of each internal gear tooth ranges between about 1.9/diametral pitch to about 2.2/diametral pitch to provide sufficient clearance between the tips of the external gear teeth and the roots of the internal gear teeth, and between the tips of the internal gear teeth and the roots of the external teeth.

7 Claims, 7 Drawing Sheets

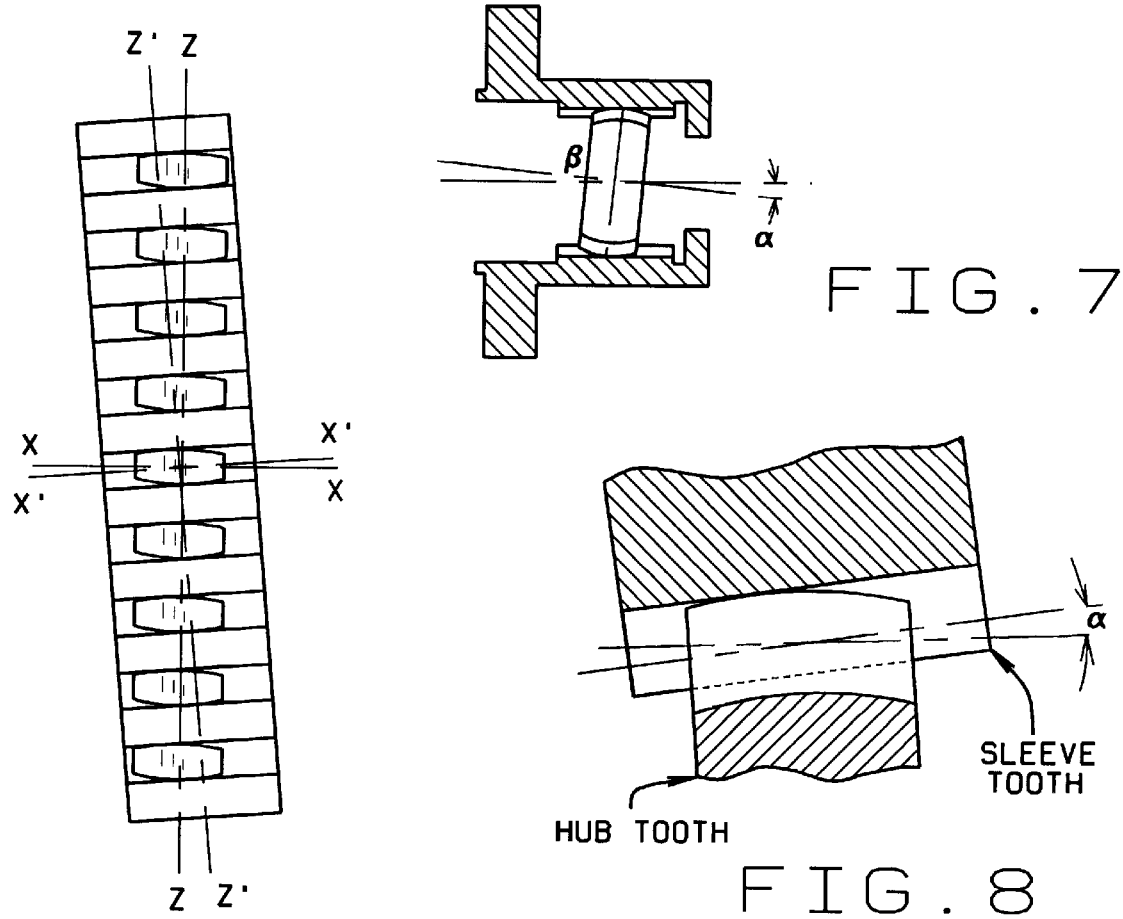
FIG. 7
FIG. 8
FIG. 6
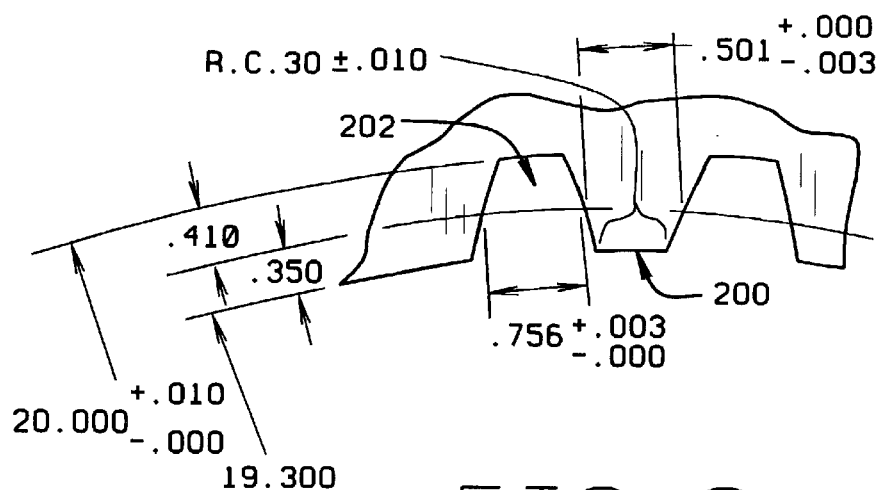
FIG. 9

6,026,700

TOOTH FORM PARAMETERS FOR GROUND TEETH OF GEAR SPINDLE COUPLING AND METHOD OF MAKING THE SAME

CROSS-REFERENCE TO RELATED APPLICATIONS

This application claims priority from provisional U.S. application, Ser. No. 60/050,193, filed Jun. 19, 1997.

STATEMENT REGARDING FEDERALLY SPONSORED RESEARCH OR DEVELOPMENT

Not Applicable.

BACKGROUND OF THE INVENTION

This invention relates to gear spindles such as may be used to drive roll forming rolls of a steel (or other metal) rolling mill or the like. It will be understood that such gear spindles have many applications and that the following description in the application of a steel rolling mill is merely exemplary.

As shown in FIG. 1, a typical steel mill rolling station includes a pair of rolls R1 and R2 mounted in a roll frame F through which steel forms (e.g., slabs, billets, blooms, bars, structural shapes or the like) are rolled. Rolls R1 and R2 are adjustable toward and away from one another over a limited range so as to vary the spacing between the rolls for carrying out the rolling operation. Typically, the rolls R1 and R2 are driven by a motor M whose output shaft drives a speed reducer SR. The output shaft of the speed reducer drives a coupling which in turn drives a pinion gear having two output shafts S1 and S2 spaced vertically from one another for driving rolls R1 and R2, respectively. Each shaft S1 and S2 has respective centerlines CL1 and CL2 (which are also referred to as pinion centerlines, as will be hereinafter described). Each roll R1 and R2 has a respective roll shaft RS1 or RS2 and each has a respective roll shaft centerline RSC1 or RSC2. As generally indicated at GSC1 and GSC2, gear spindle couplings are provided for transmitting power (torque) from shafts S1 and S2 to roll shafts RS1 and RS2, respectively. In addition, these gear spindle couplings accommodate angular misalignment between the centerlines of the input and output shafts (e.g., misalignment between CL1 and RSC1 and between CL2 and RSC2), and accommodate axial movement between their respective input and output ends (i.e., between shafts S1 and RS1 and between shafts S2 and RS2) upon the spacing of rolls R1 and R2 being adjusted during the roll forming operation. In general, gear spindle couplings can accommodate only small angular misalignment (generally less than 3 degrees and more typically about 1½ degrees). Further, the gear spindle couplings are subjected to high shock loading as a steel billet or the like encounters the rolls R1 and R2.

As shown in FIG. 2, each gear spindle coupling GSC1 or GSC2 includes a pinion end (driver) coupling PC, a roll end (driven) coupling RC, and a torque transmitting shaft TS spanning between the pinion and roll couplings. As shown in FIG. 2, pinion end coupling PC includes a sleeve 11 adapted to receive shaft S1 and to transmit torque from shaft S1 to torque shaft TS. Likewise, roll end coupling RC has a sleeve 111 adapted to received roll shaft RS1 and to drive roll R1. Torque shaft TS has a spline SP incorporated therein which allows torque to be transmitted, but which also allows for changes in the length of the torque shaft as the spacing between rolls R1 and R2 is varied. The construction and operation of the pinion and roll end couplings and of the spline are well known by those skilled in the art and are not directly part of the present invention. Thus, the pinion and roll end couplings will not be described in detail, except as required to understand the operation and function of the present invention.

Again referring to FIG. 2, pinion end coupling PC has a sleeve gear, as generally indicated at 13, mounted in the outboard end of sleeve 11 for receiving one end of torque shaft TS in a manner as will appear. Sleeve gear 13 has internal gear teeth 15 formed around its inner bore. The sleeve gear 13 is fixedly mounted relative to coupling sleeve 11 and rotates with the coupling sleeve. The end of torque shaft TS coupled to the pinion end coupling PC has a gear 17 on its end having external hub teeth 19 in mesh with internal gear teeth 15 of sleeve pinion 13.

The roll end coupling RC has a similar sleeve gear 113 mounted within sleeve 111 for receiving the other end of torque shaft TS. Sleeve gear 113 has internal gear teeth 115 formed in its inner bore. Sleeve gear 113 is fixedly mounted to sleeve 111 and rotates with the sleeve. The other end of torque shaft TS has a hub gear 117 thereon having external hub teeth 119 in mesh with internal gear teeth 115 of sleeve gear 113. It will be understood that for purposes of this disclosure, sleeve gears 13 and 113 and hub gears 17 and 117 are similar and thus, for purposes of brevity and clarity, only sleeve gear 13 and hub gear 17 will be discussed in detail. However, the disclosure of this invention will apply to both sleeve gears and hub gears.

As shown in FIG. 2, the face width of internal sleeve gear teeth 15 is substantially wider than the face width of external hub gear teeth 19 in mesh therewith for purposes as will appear. Because the sleeve and hub gears operate with a degree of angular misalignment therebetween, the hub gear teeth 19 are typically crowned (as illustrated in FIG. 3). That is, the flanks of the hub gear teeth 19 are crowned so as to accommodate angular misalignment and to minimize backlash (i.e., the difference in thickness between the hub gear and the sleeve gear teeth). Of course, it will be appreciated that it is this backlash and the amount of tooth curvature that allows for the desired angular misalignment between shaft S1 and roll shaft RS1. Further, the tips, roots and chamfers of the gear teeth are crowned to prevent interference at high angles. The amount of curvature used on the hub gear teeth is important to the service life of the teeth. It will be appreciated that too sharp a curvature can cause premature wear, pitting and tooth breakage. A typical crowned hub gear tooth 19 is shown in FIG. 3 and in FIGS. 3A–3C which show various cross sectional profiles of the tooth.

The gear spindle typically has a pressure angle between the teeth of the sleeve gear 13 and the hub gear 17 of either 20° or 25°. These pressure angles allow for a more uniform load distribution over the flanks of the teeth and prevent point contact which undesirably results in high compressive (Hertzian) stresses that leads to premature tooth failures.

In general, there are three types of stresses that the gear teeth of a gear spindle experience, namely, a. Hertz (compressive) stresses that causes failure from wear.

b. Subsurface shear stress where failure is exhibited from pitting of the gear tooth surfaces and/or from spauling.

c. Root tooth bending stresses which causes the teeth to break at their roots.

The highest stresses are typically located at the contact point between the sleeve and hub gear teeth and at the root of the gear teeth. For gear spindles that operate at light loads and high angles, the tooth design is typically limited by stresses at the tooth contact point (i.e., Hertz stresses) and thus surface hardening of the teeth is employed to improve wear. However, for larger spindles that are highly loaded and that operate at more moderate angles (e.g., 1°–1½°) of angular misalignment, the gears are typically fabricated of a high strength steel, such as ASTM 4140 or 4340, which is usually sufficient to handle the bending stresses at the root. However, as the angular misalignment range, shown in FIGS. 4–8, of the coupling is increased, (e.g., over 1½₀°), the gears are typically fabricated of materials having a higher core hardness and/or the strength of the outer surface must be increased to carry the higher stresses. Such materials may includes Nitralloy 135 & N materials grade carburizing steels such as ASTM 8620, 4320, or 3310. Generally, the depth of penetration of the hardening process is about ⅙ to about ⅕ the tooth thickness. Of course, increasing the hardness of the surface of the gear teeth results in increased wear resistance and improved tooth strength.

In theory, if there were no angular misalignment between the sleeve gear and the hub gear, and if the gear teeth were perfectly machined, there would be 100% contact between the flanks of the sleeve gear teeth and the hub gear teeth. However, due to the nature of gear couplings, they are intended to accommodate certain ranges of angular misalignment. Further, it is not possible to perfectly machine the gear teeth. These factors result in a lower portion of the flanks of the gear teeth in contact with one another and wear increases because of sliding action (instead of rolling or conjugate action) between the "mis-formed" flanks of the gear teeth. As noted above, material selection and surface hardening treatments minimize the wear of the teeth, but distortions due to machining imperfections and due to thermal cycles (which are inherent in surface hardening treatments) contribute to uneven spacing of the teeth on the gears and in tooth profiles.

In the past, it has been known to first form the teeth to a desired nominal size, to then surface harden the teeth, and then to perform a secondary forming operation (e.g., shaving or lapping) so that the tooth spacing and profile will better conform to the desired spacing and profile.

More specifically, it has been heretofore known that carburized external gear teeth for speed reducers, which are ground subsequent to heat treatment, can eliminate tooth forming irregularities and inaccuracies due to subsequent heat distortion from heat treatment processes, thus increasing the strength of the gear teeth with a resultant increase in service life. Gear grinding has long been used as a secondary finishing operation for correcting machining inaccuracies, and for removing heat treatment distortions so as to result in accurately formed external gears that operate quietly and have better strength. However, heretofore, it has not been possible to grind the internal teeth of the sleeve gear of the gear spindle couplings without introducing stress risers at the root fillets of the internal gear teeth. Stress risers significantly weaken the strength of the teeth with a concomitant reduction of the service life of the internal gear teeth.

Heretofore, in forming internal gear teeth in a gear spindle coupling, lapping instead of grinding has been used to correct heat treatment and machining errors. Lapping is usually accomplished by running a set of gears in mesh or by running one gear with a gear-shaped master lapping tool to correct errors in involute profile, tooth spacing, and concentricity. As the gears are run (engaged to operating misalignment) with one another, an abrasive lapping compound is used to remove metal from the profile of the teeth. However, lapping is undesirable not only because it is a time consuming operation, but also because each tooth of the sleeve gear must be individually lapped to properly mesh with its corresponding tooth on the hub gear. Thus, the gears are lapped in pairs and must be maintained in matched sets to obtain the optimal benefits of the process. Thus, such lapped gears are not interchangeable without the loss of their benefits.

As noted, prior to the present invention, it has not been possible to successfully grind internal gear teeth. More specifically, in grinding straight cut gear teeth (i.e., where the gear teeth are parallel to the center axis of the gear), the gear is mounted on a shaft and a pair of twin grinding wheels rotating at high speed and are brought into grinding engagement with the profile of the gear teeth to remove precise amounts of material, thereby to shape the gear profile to a desired shape and to form the teeth on a predetermined spacing. The grinding wheels are mounted on a head, and like a shaper, are reciprocated back and forth across the work. During the reciprocating movement, the gear is rolled past the grinding wheel. Generally, the active surfaces of the grinding wheels are the extreme edges. Thus, it is necessary to provide adequate clearance for the edges of the grinding wheels at the root fillet of the internal teeth of a sleeve gear or the like so as to insure that the active grinding surfaces of the grinding wheels have access to all portions of the tooth profile to be finally formed by the grinding wheels. The necessity of providing sufficient clearance for the grinding wheels has heretofore resulted in introducing unwanted stress risers at the root fillets of the internal gear teeth that significantly reduced the strength of the gear teeth and made the teeth so formed much more susceptible to bending fatigue failures. It is to be understood that grinding wheels could be shaped to allow grinding through the tooth radii. However, grinding into the tooth radii puts tensile stresses into the root from the grinding operation which are also undesirable.

Thus, there has been a long-standing need for a tooth construction (i.e., tooth form) and for a tooth forming methodology for allowing internal gear teeth to be formed, surface hardened (with the resultant thermal distortions), and then to enable the teeth to be ground to a final tooth profile and spacing without forming undesired stress risers in the gear root fillets.

BRIEF SUMMARY OF THE INVENTION

Among the several objects and advantages of the present invention are:

The provision of special tooth form for the internal gear teeth which permits grinding of the tooth profile after surface hardening without introducing undesired stress risers which weaken the teeth;

The provision of such an internal gear tooth form which when ground increases the strength of the teeth significantly with a corresponding increase in service life of the gear;

The provision of such an internal and external gear tooth form which when ground enables an increased number of teeth to be in mesh, thus lowering wear rates on the teeth and reducing loading on individual teeth, which results in longer service life for a gear spindle coupling incorporating such gears;

The provision of such an internal gear tooth form which allows the teeth to be ground without grinding the root radii of the teeth and without introducing tensile grinding stresses in the teeth, thus reducing the tendency of the teeth to fail from fatigue cracking;

The provision of such a tooth form for internal gear teeth and of a method of grinding such teeth in which the resulting internal gear may be quickly and economically fabricated and such that desired tolerances and dimensions may be readily achieved such that the gear hubs and sleeves so made are interchangeable with one another;

The provision of such a tooth form and method of grinding such internal gear teeth in which the gear teeth may be hardened by any number of known surface hardening procedures (e.g., nitrided, flame hardened, induction hardened, carburized, etc.);

The provision of such a tooth form and method of grinding such internal gear teeth may be used on a wide range of gears for various applications having various pressure angles, pitch diameters, and diametrical pitches; and The provision of such a tooth form and method which can be used for a wide variety of gear applications that require surface hardening of the gear teeth.

Briefly stated, the present invention sets forth a gearset for a gear spindle coupling and method for forming the same, which may be ground after surface hardening without the introduction of undesired structural weakening. The gearset consists of a sleeve gear and a hub gear. The sleeve gear includes internal gear teeth, and the hub gear includes external gear teeth in mesh with the sleeve gear internal teeth. Each internal sleeve gear tooth has an internal profile with the tooth height ranging from about 1.9 to about 2.2 divided by the diametral pitch of the sleeve gear, DPS and each external hub gear tooth has a contact height less than its whole depth. The contact height of the external tooth ranges from about 1.4 to about 1.6 divided by the diametral pitch of the hub gear, DPH with the hub gear tooth region ranging between about 1.4/diametral pitch to about 1.6/diametral pitch. The whole depth of each external gear tooth ranges between about 1.5/DPH to about 1.8/DPH, and, as already stated, the whole depth of each internal gear tooth ranges between about 1.9/DPS to about 2.2/DPS to provide sufficient clearance between the tips of the external gear teeth and the roots of the internal gear teeth, and between the tips of the internal gear teeth and the roots of the external teeth.

A gearset formed by first tooling gear blanks to nominal dimensions approximating the ratios set forth above, followed by a process of surface hardening and grinding results in internal and external gear teeth with significantly extended service lifespans, and with reduced tensile grinding stresses.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 6 is a flat pattern layout of the internal gear teeth of sleeve gear showing how the crowned external gear teeth of the hub contact the sleeve gear teeth across the face width of the sleeve gear teeth due to angular misalignment of the vertical Z axis;

FIG. 7 is a cross sectional diagrammatic view along the X (longitudinal) axis of the coupling illustrating the fully crowned teeth of the hub gear in mesh with the internal sleeve gear teeth with the maximum angular misalignment of the coupling;

FIG. 8 is another view of a crowned hub gear tooth in mesh with the internal teeth of the sleeve gear when the hub gear is angularly misaligned with respect to the sleeve gear;

FIG. 9 is a view of the profile of the internal teeth of a sleeve gear to be formed in accordance with the method of this invention prior to carburization hardening, illustrating key dimensions for a 20.000 pitch diameter, 2.5 pitch gear, with 50 internal teeth, and with a 25° pressure angle at the pitch diameter;

Corresponding reference numerals indicate corresponding parts throughout the several figures of the drawings.

DESCRIPTION OF THE PREFERRED EMBODIMENT

Figure 1:
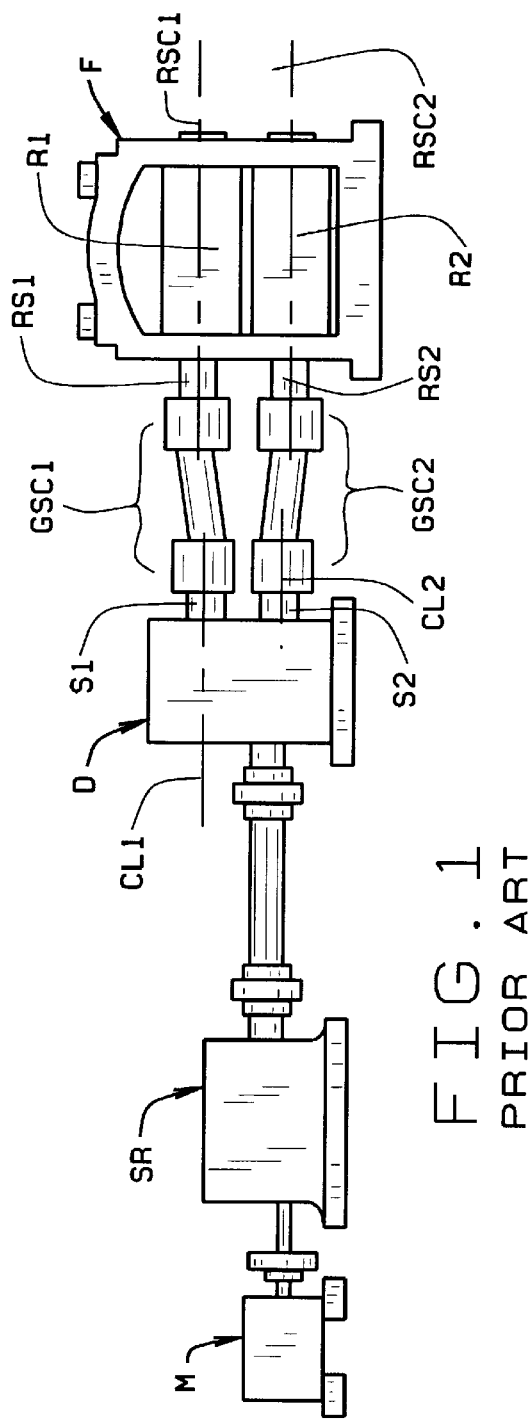
FIG. 1 is a diagrammatic depiction of a typical prior art rolling station of a steel mill hot strip rolling mill illustrating a pair of rolls mounted in a roll frame for rolling steel into a desired shape, with the rolls being driven by an electric motor or other prime mover through a speed reducer and a dual output shaft pinion gear drive with the output shafts of the dual output shaft drive each being coupled to a respective roll by means of a gear spindle coupling.
Figure 2:
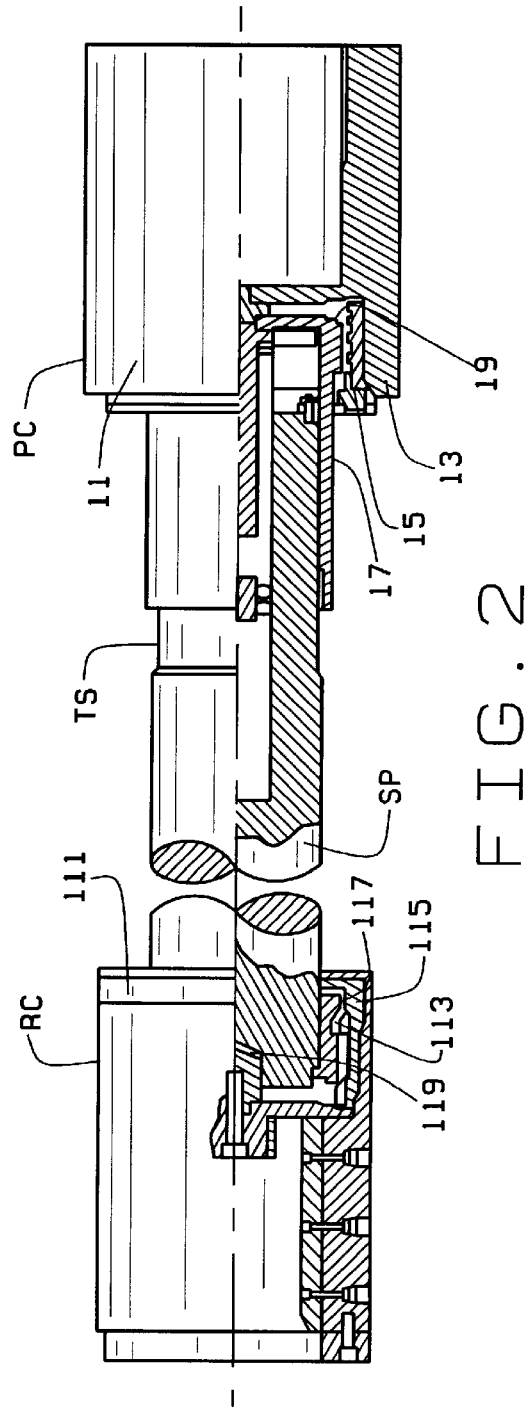
FIG. 2 is a side elevational view of a gear spindle coupling having a pinion (drive) end sleeve, a roll (driven) end sleeve, a torque transmitting shaft between the sleeves with each of the sleeves having a sleeve gear therein, with the sleeve gear having internal teeth for receiving and being in mesh with a hub gear having external gear teeth mounted on a respective end of the torque transmitting shaft.
Figure 3:
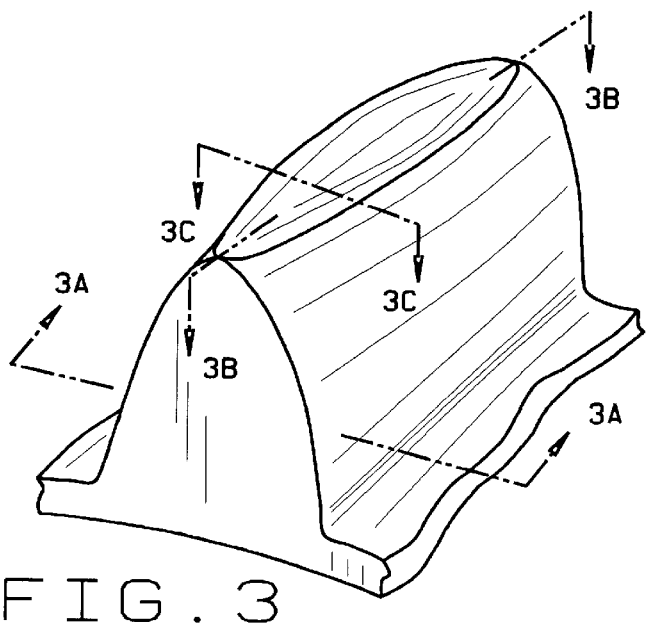
FIG. 3 is a perspective view of a typical prior art hub gear external gear tooth which is fully crowned.
Figure 3A:
FIGS. 3A–3C are sectional views taken along respective section lines in FIG. 3 showing various cross sections and profiles of the fully crowned external hub gear tooth.
Figure 3B:
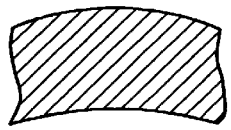
Figure 3C:
Figure 4:
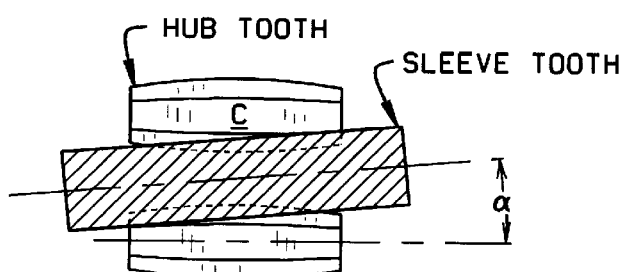
FIG. 4 is a diagrammatic view of a single straight cut internal sleeve tooth and how it contacts external hub teeth in mesh therewith with the gear spindle coupling accommodating its maximum angular misalignment.
Figure 5:
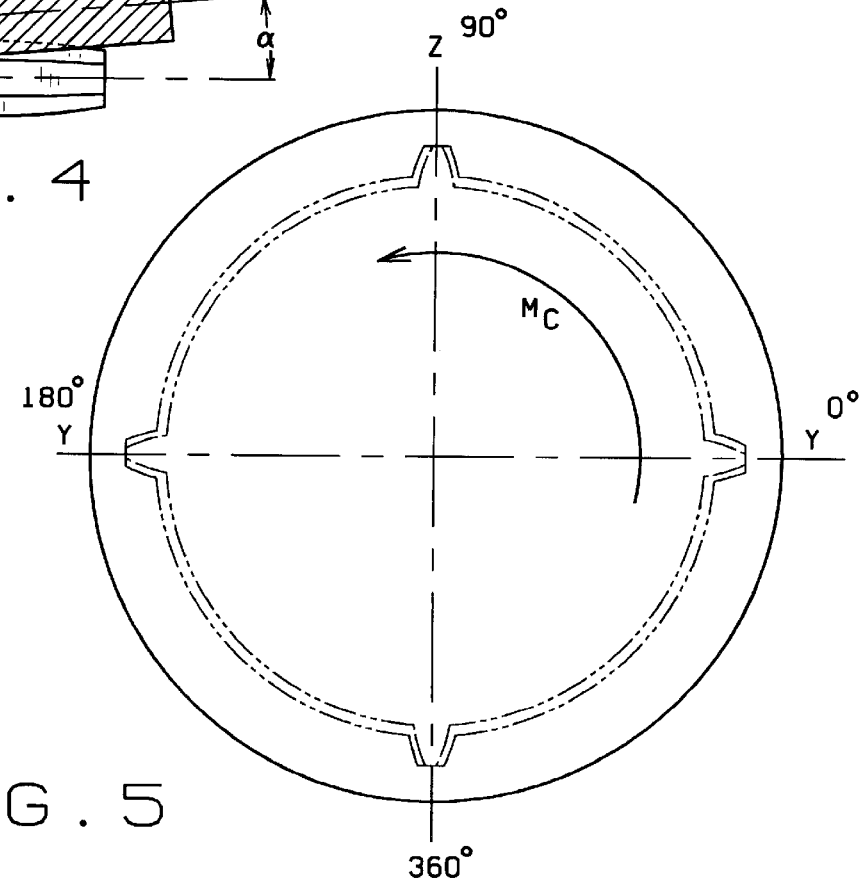
FIG. 5 is a diagrammatic face view of the hub gear in mesh with the internal teeth of the sleeve gear showing a maximum amount of backlash so as to accommodate angular misalignment such that the hub gear tooth on the horizontal axis Y at 0° is in mesh with its respective internal sleeve gear tooth, such that the hub gear tooth on the Y axis at 180° is in engagement with the trailing internal sleeve gear tooth, and such that the hub gear teeth on the vertical axis Z are clear of their respective internal sleeve gear teeth.

The following detailed description illustrates the invention by way of example and not by way of limitation. The description will clearly enable one skilled in the art to make and use the invention, describes several embodiments, adaptations, variations, alternatives, and uses of the invention, including what we presently believe is the best mode of carrying out the invention.

Referring now to the drawings, and more particularly to FIGS. 9–14, and FIG. 16, the tooth forms of the present invention, and the method of forming such a tooth forms, are illustrated with such pertinent information that it is believed that one of ordinary skill in the gear design and fabrication art could make and use the present invention, and achieve the objects and features described above.

The formation of a gearset of the present invention for use in a gear spindle coupling or the like, comprising a sleeve gear and a hub gear begins with the cutting of internal and external gear teeth to nominal dimensions, using commonly employed tooling and techniques. FIGS. 9–14 illustrate the steps and dimensions of an exemplary gearset of the present invention. As gearsets having pitch diameters ranging from 1.000" to 40.000" may be formed in accordance with the steps described below, one skilled in the art will recognize that the illustrated dimensions will vary in accordance with the ratios provided in the general description of the invention set forth below.

Figure 10:
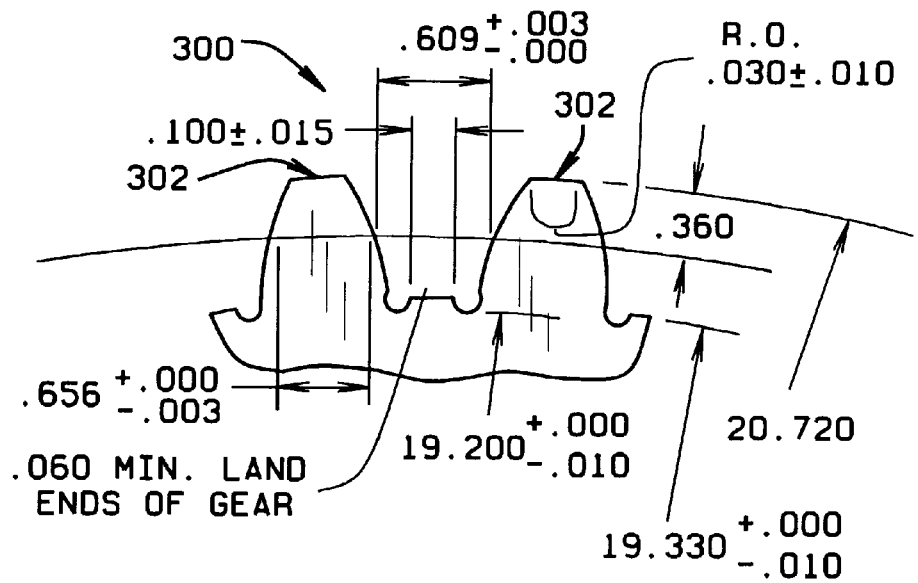
FIG. 10 is a similar view of the profile of the external teeth of a corresponding hub gear prior to carburizing.
Figure 10A:
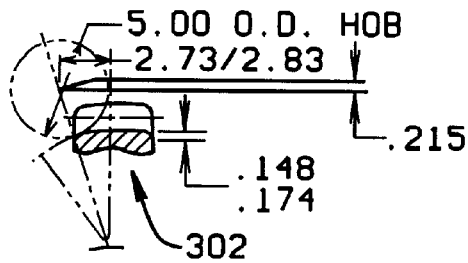
FIG. 10A is an edge view of FIG. 10, illustrating the cross-sectional profile of the fully crowned hub gear teeth showing certain key dimensions for such teeth of the exemplary gear illustrated in FIGS. 9–14 herein.
Figure 10B:
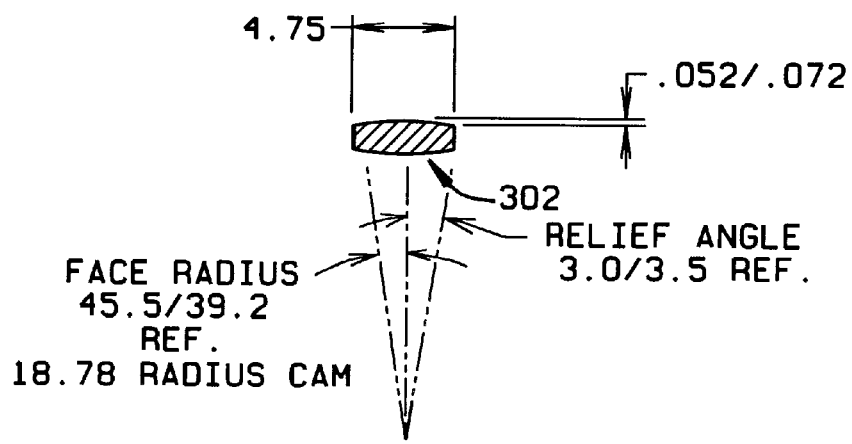
FIG. 10B is a cross section view of a hub gear tooth of FIG. 10 taken along the pitch diameter showing certain key dimensions of the tooth.

As shown in FIG. 9, the basic dimensions for an internal tooth gear (sleeve gear) 200 of the present invention, having a 20.000" pitch diameter, a 2.5 pitch, and 50 internal gear teeth 202, are shown. Corespondingly, FIG. 10 illustrates the basic dimensions of an external tooth gear (hub gear) 300 of the present invention intended to mesh with the sleeve gear 200 of FIG. 9. As noted, each external tooth 302 of the hub gear 300 is crowned, as best seen in FIGS. 10A and 10B, which include additional pertinent dimensions for the hub gear of FIG. 10. The dimensions shown in FIGS. 9–10B are the nominal dimensions for the sleeve gear and the hub gear prior to hardening, and include approximately 50% grinding stock allowance.

Figure 11:
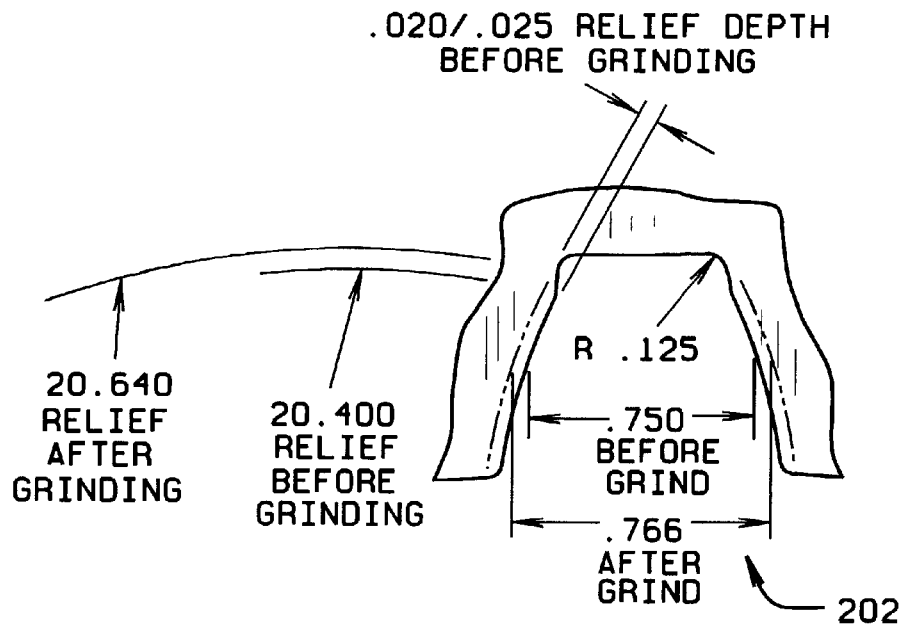
FIG. 11 is a view of the internal profile of a sleeve gear tooth after carburizing, but before grinding, illustrating the relief both before and after grinding at the root of the tooth, the spacing between the internal teeth at the pitch diameter both before and after grinding, and further illustrating the material to be removed during the grinding (if present)
Figure 12:
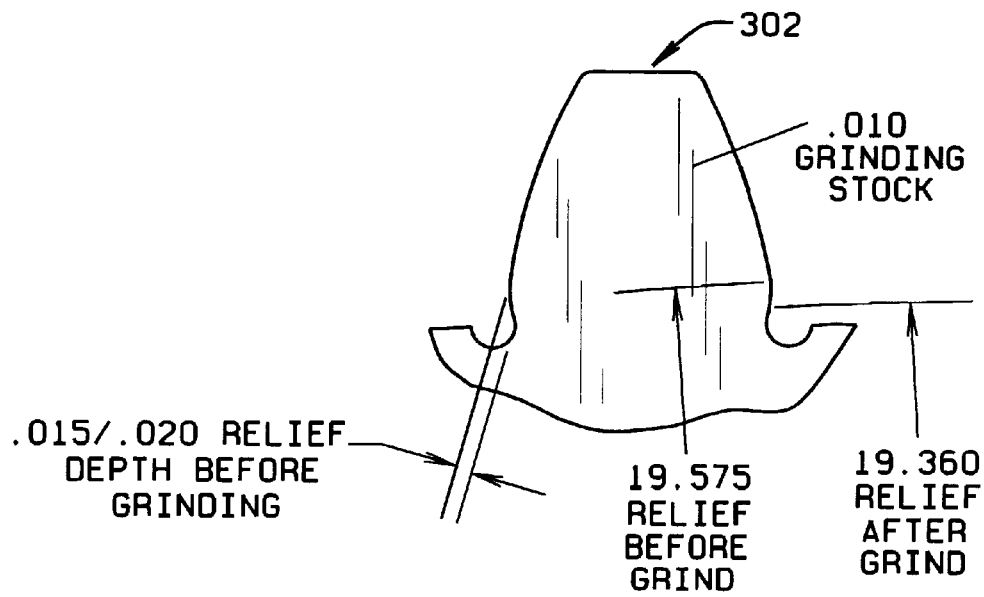
FIG. 12 is a view of the external profile of the hub gear teeth after carburizing, showing certain key dimensions for the relief depth before and after grinding at the root fillet of the teeth and showing the grinding stock to be removed during the grinding operation.
Figure 13:
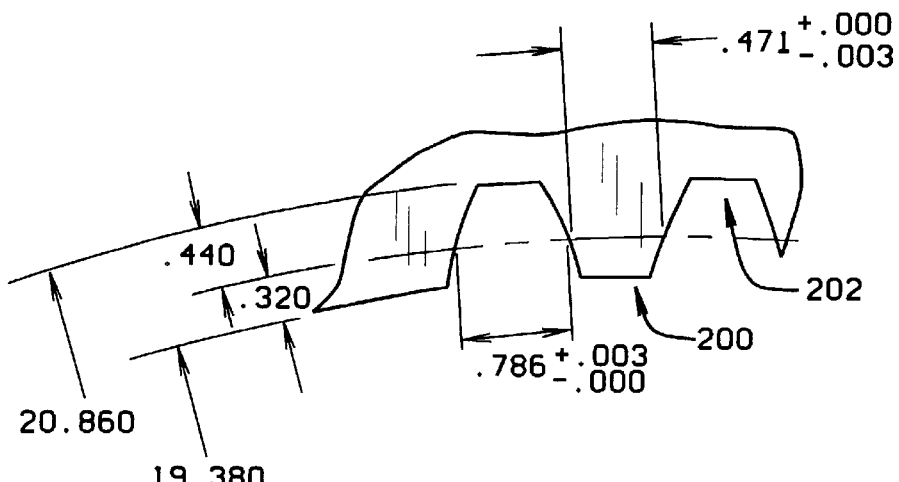
FIG. 13 illustrates certain key dimensions for an internal pin check of the internal teeth ground on the sleeve gear in accordance with the method of the present invention.
Figure 14:
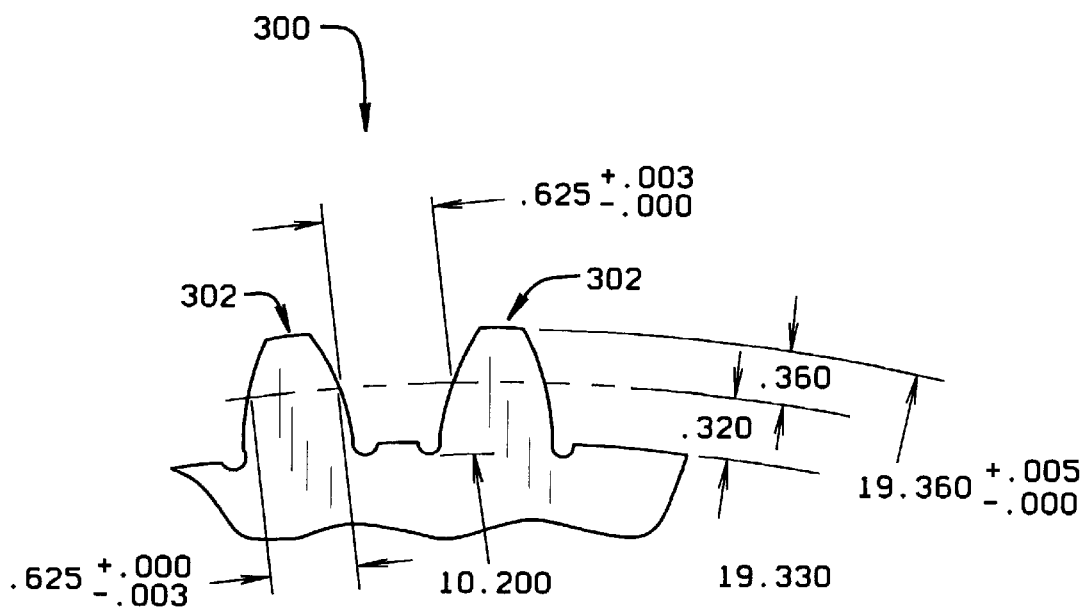
FIG. 14 illustrates certain key dimensions for external pin check of the external teeth ground on the hub gear in accordance with the method of the present invention.
Figure 15:
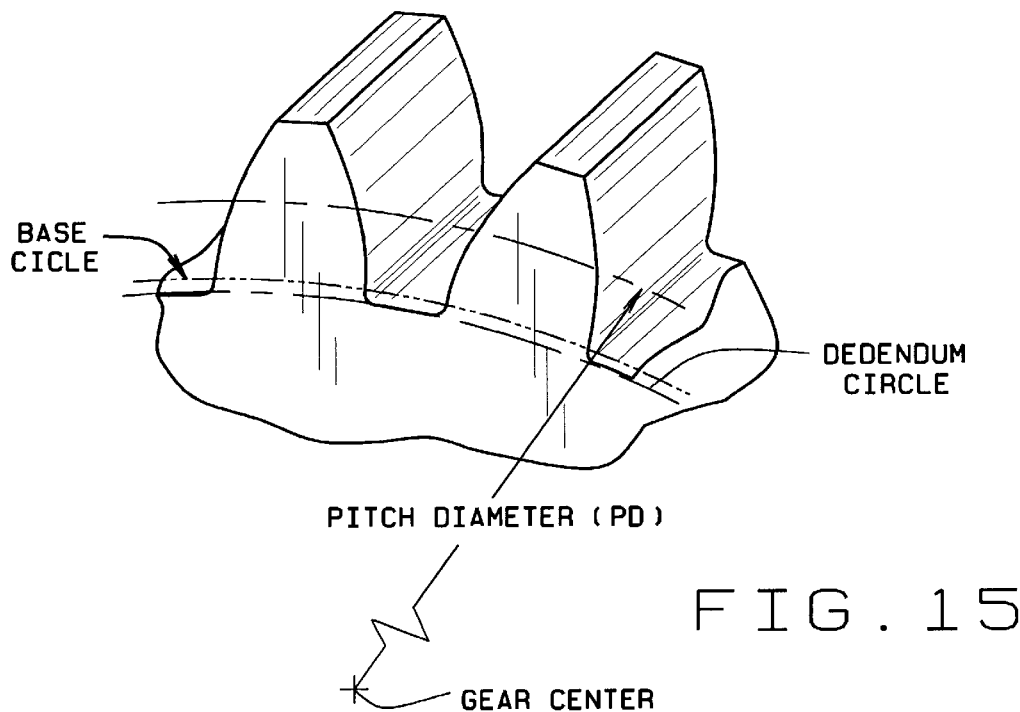
FIG. 15 is a partial perspective view of two adjacent straight gear teeth showing conventional gear nomenclature.

After cutting the gear teeth to the nominal dimensions shown, the sleeve and hub gears are hardened to resist wear, and to increase the useful service life. The preferred hardening method is by carburization, although other heat treatment techniques, well known in the art, may be employed within the scope of the invention. Following the hardening treatment, a grinding operation is employed to correct machining inaccuracies in the nominal gear teeth dimensions, and for removing any distortions caused by the application of heat during the hardening process. FIG. 11 illustrates the profile of the gear teeth 202 of the sleeve gear 200 after carburization, prior to grinding. The dimensions shown indicate the depth of material to be removed during the grinding operation. Similarly, in FIG. 12, the profile of an external gear tooth 302 of the hub gear 300 is illustrated, and the critical dimensions (i.e. the relief depth before grinding and the amount of grinding stock on the tooth) are shown. FIGS. 13 and 14 illustrate the pin check dimensions for the sleeve gear 200 and hub gear 300 of FIGS. 11 and 12 after the completion of the grinding operation.

Figure 16:
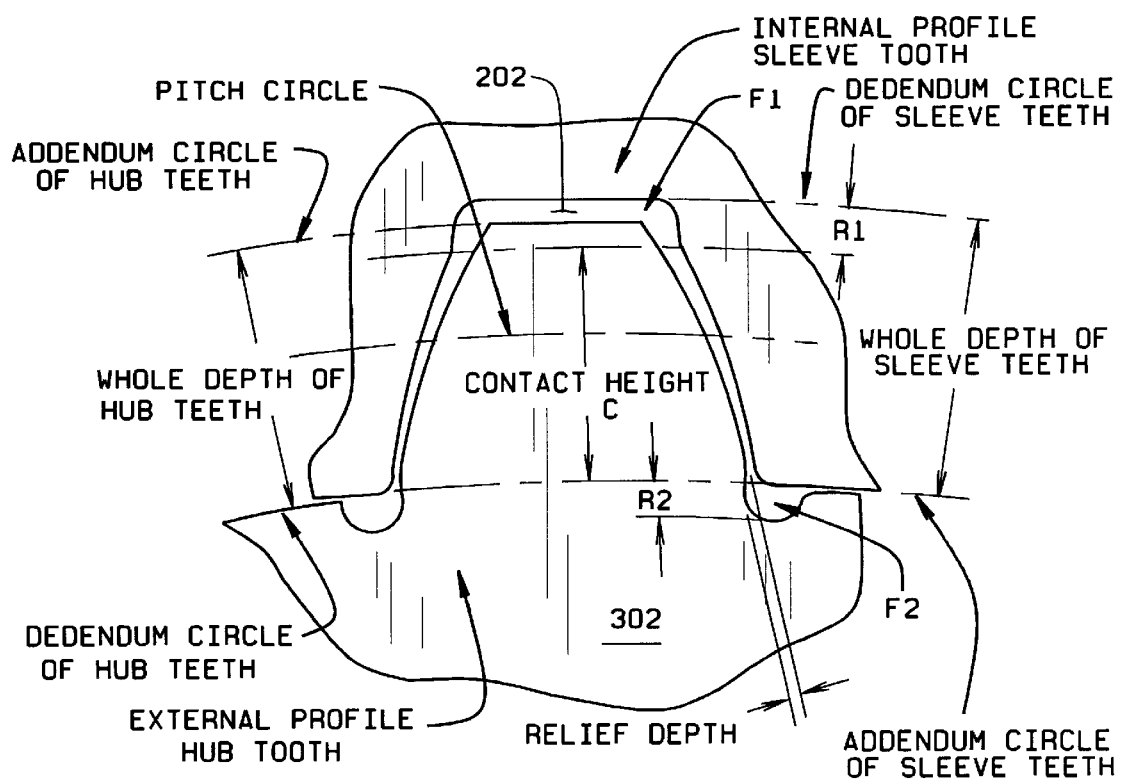
FIG. 16 illustrates an external gear tooth of a hub gear in mesh with adjacent internal teeth of a sleeve gear of a gear spindle coupling where the gears are ground in accordance with the method of the present invention, illustrating various parameters of the present invention and showing nomenclature for such internal and external gears.

Turning now to FIG. 16, the general relationship of the external gear tooth 302 and the internal gear tooth 202 formed to mesh therewith, formed in accordance with this invention, in a gear spindle or the like is shown. The internal teeth 202 of the sleeve gear are formed with tooth heights within the range of 1.9 divided by the diametral pitch of the sleeve gear (DPS) to 2.2/DPS, and with the whole depth of the internal teeth 202 ranging from about 1.9/DPS to 2.2/DPS. To allow for sufficient grinding clearance, the relief depth R1 of the internal gear teeth 202 at the fillets F1 of each internal gear tooth ranges from about 0.2/DPS to 0.3/DPS. Additionally, the tip of each internal gear tooth 202 extends radially inward from the sleeve gear 200, beyond the pitch diameter of the sleeve gear by about 0.8/DPS.

The external teeth 302 of the hub gear are formed with fully crowned tips to accept pressure angles in the range of 20°–30°, and with a contact height C less than the height of the tooth. The contact height C ranges from about 1.4 divided by the diametral pitch of the hub gear (DPH) to about 1.6/DPH. The edges of each tip are radiused between 0.020" and 0.040". The whole depth of the external gear teeth ranges between 1.5/DPH to about 1.8/DPH. To allow for sufficient grinding clearance, the relief depth R2 of the external gear teeth 302 at the fillets F2 of each external gear tooth is about 0.2/DPH.

Maintaining these ratios in the design of a sleeve and hub gearset provides sufficient clearance between the interacting roots and tips of the external teeth 302 end internal teeth 202. With these dimensions, one skilled in the art could readily make and use the tooth form and the method of forming the internal (and external) gear teeth for a gear spindle which would have the attributes of this invention, as described above in the Summary of the Invention.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

We claim:

1. A gearset for a gear spindle coupling comprising a sleeve gear and a hub gear, said sleeve gear having internal gear teeth and said hub gear having external gear teeth in mesh with said sleeve gear teeth, each of said internal sleeve gear teeth having an internal profile in which the whole depth of the teeth ranges from about 1.9 to about 2.2 divided by the diametral pitch of the sleeve gear, DPS, and each of said external hub gear teeth having a contact height less than its whole depth and with said contact height of the tooth ranging from about 1.4 to about 1.6 divided by the diametral pitch of the hub gear, DPH, with the whole depth of the external gear teeth ranging between about 1.5/DPH to about 1.8/DPH, while providing sufficient clearance between the tips of the external gear teeth and the roots of the internal gear tooth form and providing clearance between the tips of the internal gear teeth and the roots of the external teeth, wherein said whole depth of the internal gear teeth and said contact height and whole depth of the external teeth are final dimensions of said sleeve gear and said hub gear.

2. The gearset as set forth in claim 1 wherein the relief depth of said external gear teeth at the fillets of said external gear teeth is about 0.2/DPH.

3. The gearset as set forth in claim 1 wherein the tip of said internal gear tooth form extends radially inwardly of the internal gear beyond the pitch diameter about 0.8/DPS.

4. The gearset as set forth in claim 1 wherein the pitch diameter ranges between about 1.0 inch to about 40.0 inches.

5. The gearset as set forth in claim 1 wherein said external gear teeth are crowned.

6. The gearset as set forth in claim 5 wherein said external gear teeth are configured to operate at pressure angles ranging from about 20.0° to about 30.0°.

7. A method of forming the gearset set forth in claim 1, including the steps of:

tooling a first gear blank to produce said sleeve gear at nominal dimensions;

tooling a second gear blank to produce said hub gear at nominal dimensions, said hub gear and said sleeve gear forming a matching gearset;

surface hardening said sleeve gear and said hub gear; and grinding said sleeve gear and said hub gear to said final dimensions, said grinding operation removing excess material and eliminating hardening induced surface distortions.

* * * * *